UNITED STATES PATENT OFFICE.

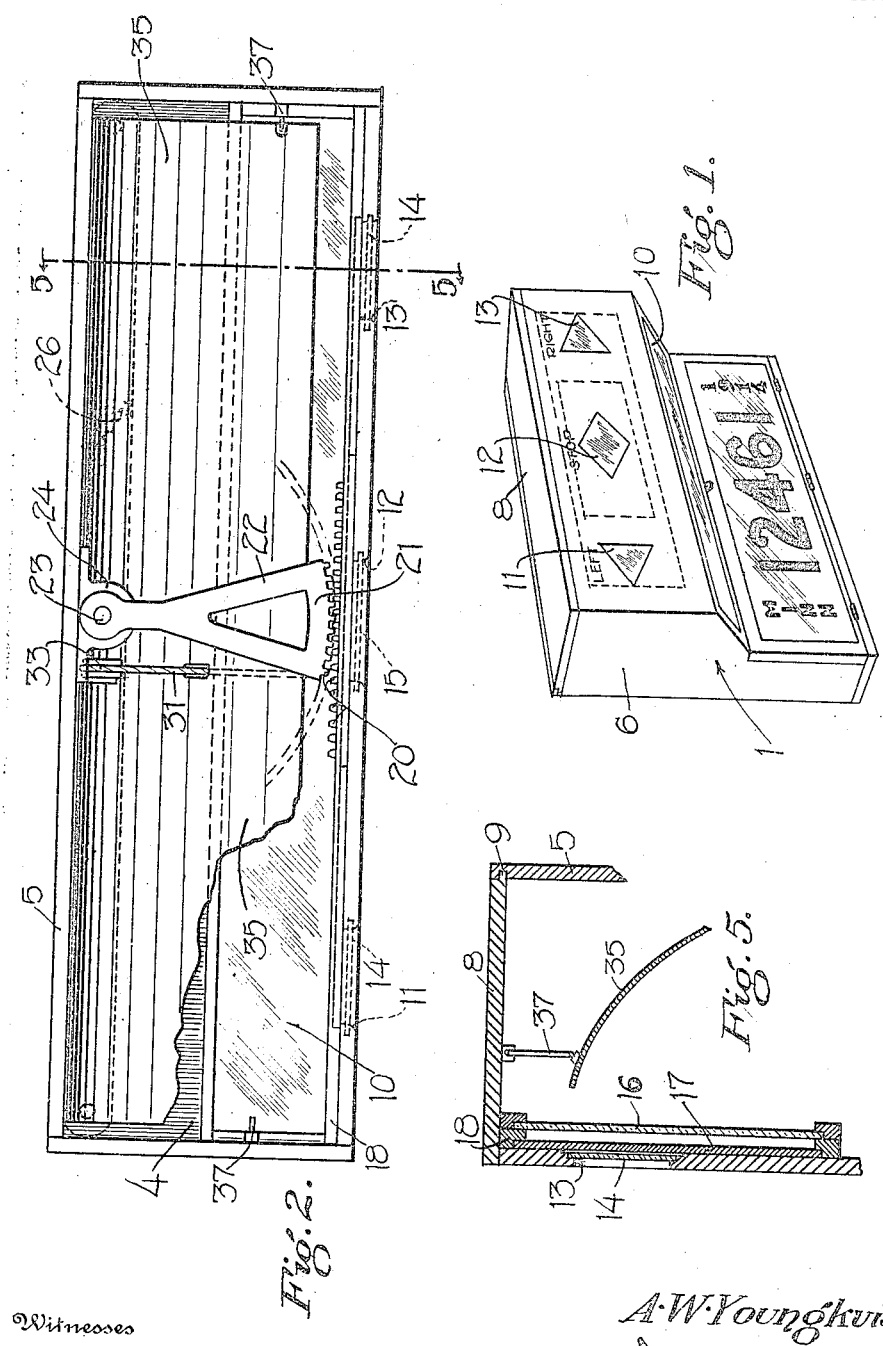

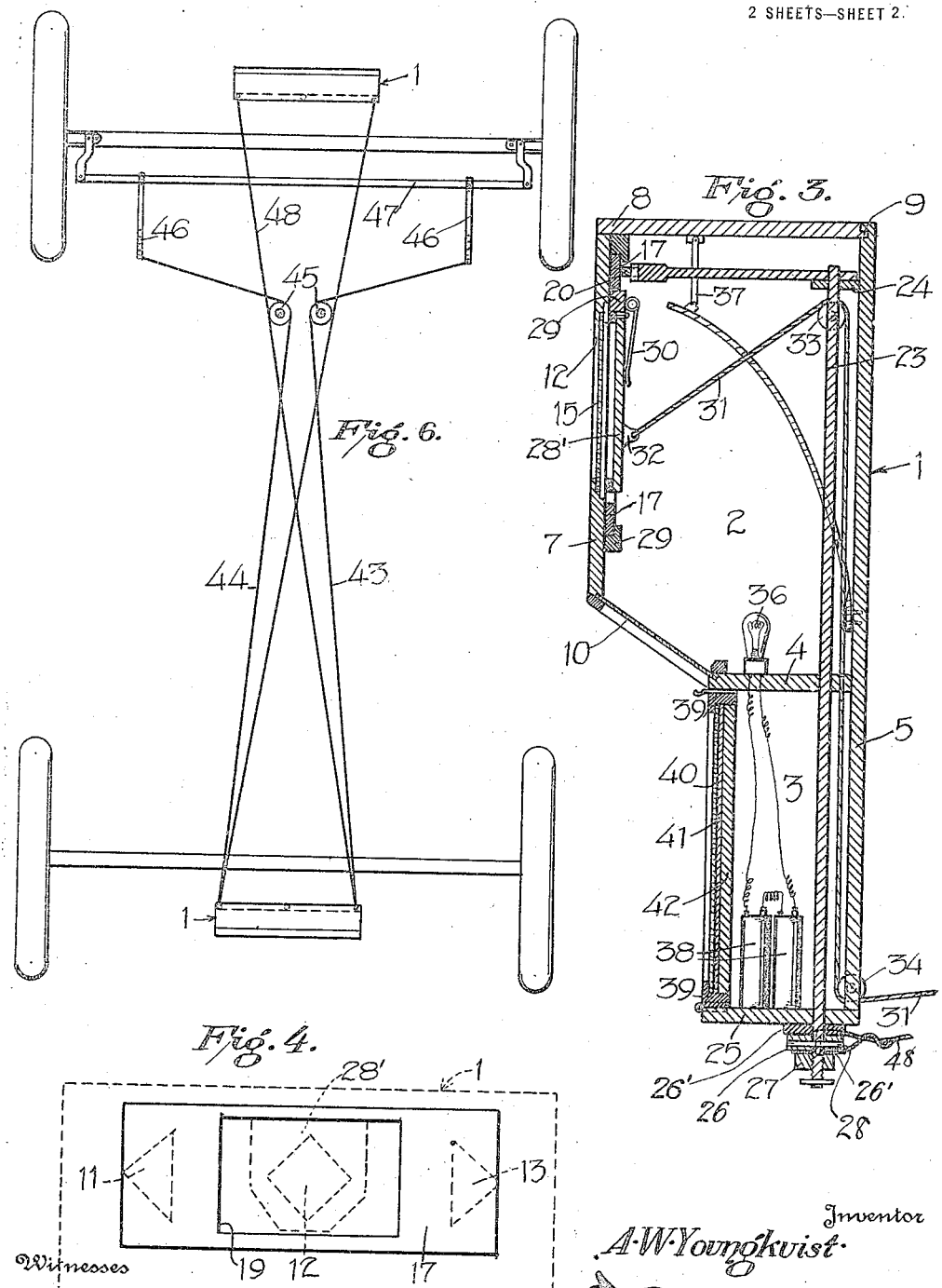

AMANDUS W. YOUNGKVIST, OF DULUTH, MINNESOTA.

VEHICLE DIRECTION-INDICATOR.

1,140,225.

Specification of Letters Patent.  Patented May 18, 1915.

Application filed December 23, 1913. Serial No. 808,498.

*To all whom it may concern:*

Be it known that I, AMANDUS WALFRID YOUNGKVIST, a citizen of the United States, residing at Duluth, in the county of St. Louis and State of Minnesota, have invented certain new and useful Improvements in Vehicle Direction-Indicators; and I do hereby declare the following to be a full, clear, and exact description of the invention, such as will enable others skilled in the art to which it appertains to make and use the same.

The primary object of this invention is to provide a direction indicator for vehicles, such as automobiles, to indicate to pedestrians and drivers of other vehicles, the direction in which the machine is going to turn.

Another and more specific object of the invention is to provide a direction indicator of this nature having a light casing provided with an outer wall formed with a plurality of openings through which the light may shine and a slidable shutter controlled by the steering rod to open and close the openings.

Another object of this invention is to provide in a direction indicator of this type, a light casing having a wall formed with three alined openings, a sliding shutter to open and close the end openings and a hinged plate controlled independently of the shutter to open and close the central opening.

A further object of the invention is to provide in combination with a direction indicator a license plate holder, the light box of the indicator being so constructed as to illuminate the lighting plate.

With these and other objects in view as will become more apparent as the description proceeds, the invention consists in certain novel features of construction, combination and arrangement of parts as will be hereinafter more fully described and claimed.

For a complete understanding of my invention reference is to be had to the following description and accompanying drawings, in which—

Figure 1 is a perspective view of my improved direction indicator, Fig. 2 is a top plan view thereof, with the cover removed, Fig. 3 is a vertical transverse sectional view through the center of the indicator, Fig. 4 is a side elevation of the sliding shutter and hinged cover plate, with a portion of the casing shown by dotted lines, Fig. 5 is a fragmentary sectional view taken on the plane of line 5—5 of Fig. 2, and Fig. 6 is a somewhat diagrammatic view, showing how two indicators, one at the front of the vehicle and the other at the rear thereof may be simultaneously operated by a movement of the steering rod.

Referring in detail to the drawings by numerals, 1 designates, as an entirety, the casing of my improved direction indicator, said casing being divided into an upper light compartment 2 and a lower compartment 3, by a horizontal wall 4.

5 indicates the rear wall of the two compartments, 6 the side walls thereof, 7 the front wall of the light compartment and 8 the cover or top of said compartment, said cover being slidably connected to the rear wall 5 by the tongue and groove connection, indicated by the numeral 9. The wall, which forms the two compartments, is of a less width than the light compartment 2, and the space between the outer edge of this wall and the lower edge of the wall 7 is covered by a glass plate 10 which is inclined downwardly and rearwardly.

The front wall 7 of the light compartment is provided with the alined openings 11, 12 and 13, the end openings being here shown of a triangular shape and the central openings being diamond shaped. The glass 14 which covers the openings 11 and 13 is preferably plain, whereas the glass 15 which covers the central opening 12 is preferably colored green. As shown in Fig. 5, a plate of colored glass 16 is positioned behind each of the end openings 11 and 12 so that a light shining through these openings will be visible in the day time.

The openings 11 and 13 are normally closed by a sliding shutter 17 in the form of a rectangular plate which is held in engagement with the inner face of the wall 7 by the channel strips 18. Referring to Fig. 4, it will be seen that this plate is just long enough to cover simultaneously both of the end openings and is provided with a central opening 19, rectangular in shape and of a suitable size.

To provide for a reciprocatory movement of the shutter 17, I provide a ratchet bar 20 secured to the inner face of the shutter adjacent the upper edge thereof but slightly below the overlapping portions of the channel strips 18. This bar is engaged by the toothed arcuate end 21 of a horizontal pivoted arm 22 connected to a vertical shaft 23. This shaft extends vertically through the casing 1 being journaled through a bracket 24, the wall 4 and the wall 25 which forms the bottom of the compartment 3. A cross bar 26 is rigidly secured centrally of its ends to the bottom of the shaft 23 and is about equal in length to the length of the casing 1. The bar is secured to the shaft by a nut 27 and a cotter pin 28. It will be evident that an oscillation of the cross bar 26 will turn the shaft 23 which will actuate the arm 22 and cause the shutter 17 to be shifted longitudinally.

Coming now to the means which I employ for covering the opening 12, 28′ designates a plate hingedly secured at its upper edge to a bar 29 supported on the wall 7 above the opening 12 and within the opening 19 formed in the shutter 17. The bar is of a less length than the opening 19 to allow the shutter to move sufficiently in either direction to properly uncover the openings 11 and 13. A spring 30 secured at one end to the bar 29 and bearing at its other end against the plate 28′ holds said plate normally in its operative position. The plate may be swung upwardly to allow light to shine through the opening 12 by means of a flexible member 31 connected at one end to an ear 32 formed upon the inner side of the plate and running around pulleys 33 and 34, the former being positioned in the compartment 2 to the rear and above the plate 28′, and the latter being secured in the wall 5 near the lower end of the compartment 3. This flexible member extends to within easy reach of the driver and when pulled will raise the hinged plate. A reflector 35 is positioned within the compartment 3 behind the openings formed in the front wall thereof and will deflect the light rays coming from the lamp 36 through the openings 11, 12 and 13. This reflector is formed with openings to accommodate the flexible member 31 and the shaft 23, as clearly shown in Fig. 3. It will be noted that the reflector consists of a curved plate secured at its lower edge to the wall 5 and supported adjacent its forward upper edge by a hanger or link 37.

The compartment 3, which contains the batteries 38 for the lamp 36, is closed by a frame 39 hingedly secured to the bottom 25 and fitting within the open side of the compartment somewhat in the manner of a door. This frame contains a glass plate 40, a sign 41 and a backing 42 to which the sign is attached. It will be evident that the backing and sign may be easily and quickly removed which greatly facilitates an interchange of license plates.

In use, my improved direction indicator is secured to the rear of a vehicle and the extremities of the cross bar 26 are connected to flexible members 43 and 44 respectively which run around pulleys 45 and which are connected at their forward ends to rearwardly extending arms 46 carried by the steering rod 47. If desired, a second indicator may be secured to the front of the vehicle and actuated by connections 48 secured in suitable openings in the ends of the cross bar 26 of the front indicator and to the cross bar of the rear indicator, as clearly shown in Fig. 6.

In operation, when the vehicle is turned to the right for instance, the steering rod 47 will be shifted to the left, causing the cross bar 26 of the rear indicator to swing so as to partially rotate the shaft 23, causing the arm 22 to shift the shutter 17 to the left and uncover the opening 13, whereby the driver of a following vehicle will be warned of a change of direction of the vehicle in question. Should a vehicle equipped with my improved indicator turn to the left, the shutter 17 will be shifted to the right and uncover the opening 11. When it is desired to signal that the vehicle is going to stop, the hinged plate 28′ is raised by a pull upon the connection 31, allowing light to shine through the opening 12. It will be observed that the hinged plate 28′ in no wise interferes with the proper movement of the shutter 17 and it is also desired to direct attention to the fact that light shining downwardly through the plate 10 will sufficiently illuminate the license plate carried in the frame 39.

While I have shown and described the preferred embodiment of my invention, it will be understood that minor changes in construction, combination and arrangement of parts may be made without departing from the spirit and scope of the invention as claimed.

Having thus described my invention, I claim:—

1. In a direction indicator for vehicles, a light casing having three openings formed in the front wall thereof, a shutter slidable against the interior of said front wall to normally close the end openings, a rack bar carried by said shutter, a rotatable shaft, means for rotating said shaft and an arm rigidly secured to the shaft formed with teeth for engagement with the rack bar, a rotation of the shaft causing the arm to move the shutter longitudinally.

2. In a direction indicator for vehicles, a light casing having a front wall formed with three alined openings, a shutter slidably secured to the inner face of said front wall of sufficient size to simultaneously close the end opening, means for moving said shutter longitudinally to uncover the end opening, the shutter being formed with a central opening, a plate hinged to said front wall and swinging within the opening in the shutter to close the central opening in the front wall, and means independent of the shutter operating means for swinging said plate to uncover the opening in the front wall.

In testimony whereof I affix my signature in presence of two witnesses.

AMANDUS W. YOUNGKVIST.

Witnesses:
P. GEO. AANSON,
HELEN C. ROONEY.